(12) United States Patent
Arnold et al.

(10) Patent No.: US 6,290,094 B1
(45) Date of Patent: Sep. 18, 2001

(54) INTEGRALLY BLOW-MOLDED CONTAINER AND CLOSURE

(75) Inventors: Jay Arnold, Landisville; David W. Cargile, Lititz; Richard K. Ogg, Littlestown, all of PA (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 09/142,190

(22) PCT Filed: Feb. 28, 1997

(86) PCT No.: PCT/US97/03153

§ 371 Date: Nov. 9, 1998

§ 102(e) Date: Nov. 9, 1998

(87) PCT Pub. No.: WO97/32791

PCT Pub. Date: Sep. 12, 1997

Related U.S. Application Data

(60) Provisional application No. 60/013,139, filed on Mar. 8, 1996.

(51) Int. Cl.[7] ............................. B29C 39/02; B29C 43/02; B65D 43/16
(52) U.S. Cl. ....................... 220/839; 215/235; 220/819; 220/826; 264/531; 264/539
(58) Field of Search ................................. 220/254, 255, 220/810, 826, 836, 837, 839; 215/235; 222/107, 478, 482, 481, 483, 484, 485; 264/500, 523, 524, 527, 531, 532, 539

(56) References Cited

U.S. PATENT DOCUMENTS

| | | | |
|---|---|---|---|
| 3,059,816 | * | 10/1962 | Goldstein ............................. 215/235 |
| 3,380,608 | | 4/1968 | Morbeck . |
| 4,082,827 | * | 4/1978 | Chlystun ............................. 264/531 |
| 4,331,233 | * | 5/1982 | Braymer, Jr. ........................ 206/221 |
| 4,337,025 | | 6/1982 | Pagels et al. . |
| 4,344,545 | * | 8/1982 | Aschberger et al. . |
| 4,382,058 | | 5/1983 | Watson et al. . |
| 4,453,911 | | 6/1984 | Watson et al. . |
| 4,486,164 | | 12/1984 | Wilkie et al. . |
| 4,486,379 | | 12/1984 | Wilkie et al. . |
| 4,713,219 | | 12/1987 | Gerken et al. . |
| 4,726,091 | * | 2/1988 | Joyce ................................... 220/819 |
| 4,832,219 | * | 5/1989 | Nycz . |
| 5,008,066 | * | 4/1991 | Mueller ................................. 215/306 |
| 5,038,454 | * | 8/1991 | Thornock et al. .................... 264/534 |
| 5,044,923 | * | 9/1991 | Przytulla . |
| 5,106,569 | | 4/1992 | Rathman et al. . |
| 5,213,235 | * | 5/1993 | Miranda . |
| 5,213,753 | | 5/1993 | Przytulla . |
| 5,320,235 | * | 6/1994 | Joyce ................................... 215/254 |
| 5,322,176 | * | 6/1994 | Dubach ................................. 220/254 |
| 5,368,176 | * | 11/1994 | Thanisch . |
| 5,431,292 | * | 7/1995 | Culter et al. ........................... 215/48 |
| 5,482,172 | * | 1/1996 | Braddock . |
| 5,497,906 | * | 3/1996 | Dubach ............................ 215/253 X |
| 5,601,214 | * | 2/1997 | Hendrickson et al. .............. 222/517 |
| 5,662,245 | * | 9/1997 | Grant ................................... 220/254 |
| 5,885,517 | * | 3/1999 | Hendrickson et al. .............. 264/539 |

FOREIGN PATENT DOCUMENTS

| | | |
|---|---|---|
| 296938 | 2/1954 | (CH) . |
| 296938 | 5/1954 | (CH) . |
| 681797 | 5/1993 | (CH) . |
| 57-2727 | 1/1992 | (JP) . |
| WO 93/22201 | 11/1993 | (WO) . |

\* cited by examiner

*Primary Examiner*—Allan N. Shoap
*Assistant Examiner*—Niki M. Eloshway
(74) *Attorney, Agent, or Firm*—Howson and Howson

(57) ABSTRACT

A blow-molded container (10) having a closure flap (14) formed of compressed material (32) integral with the container (10). Preferably, the container body (12) has a normally-closed fill port (16) and a dispensing port (18) which can be selectively opened and closed by the closure flap (14). The closure flap 14 is provided with multiple hinges (34, 38, 50) to allow the closure flap (14) to fold reversely upon itself and to allow the dispensing port (18) to be opened and closed while the fill port (16) remains closed.

20 Claims, 4 Drawing Sheets

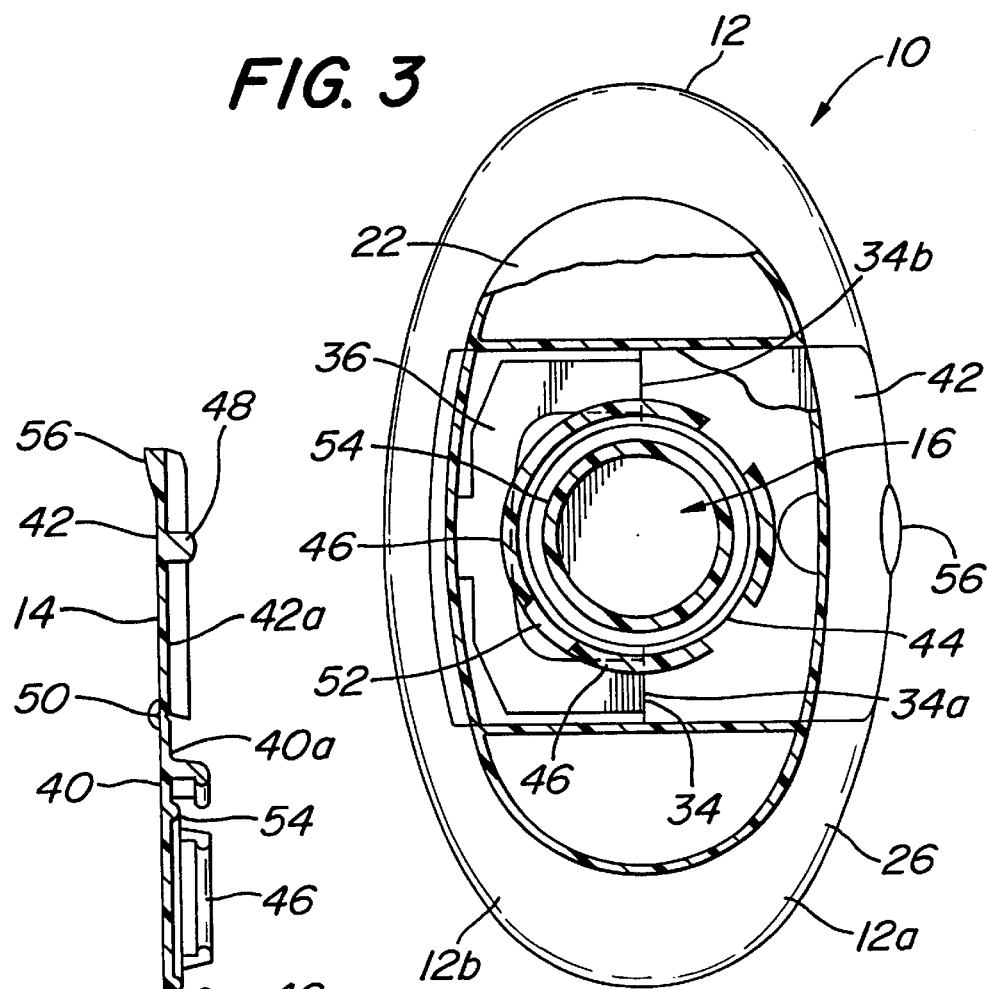
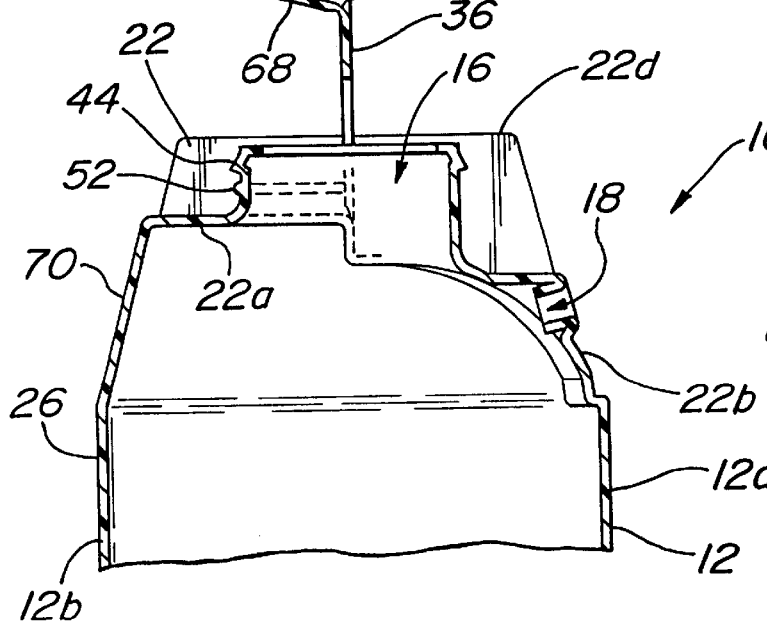

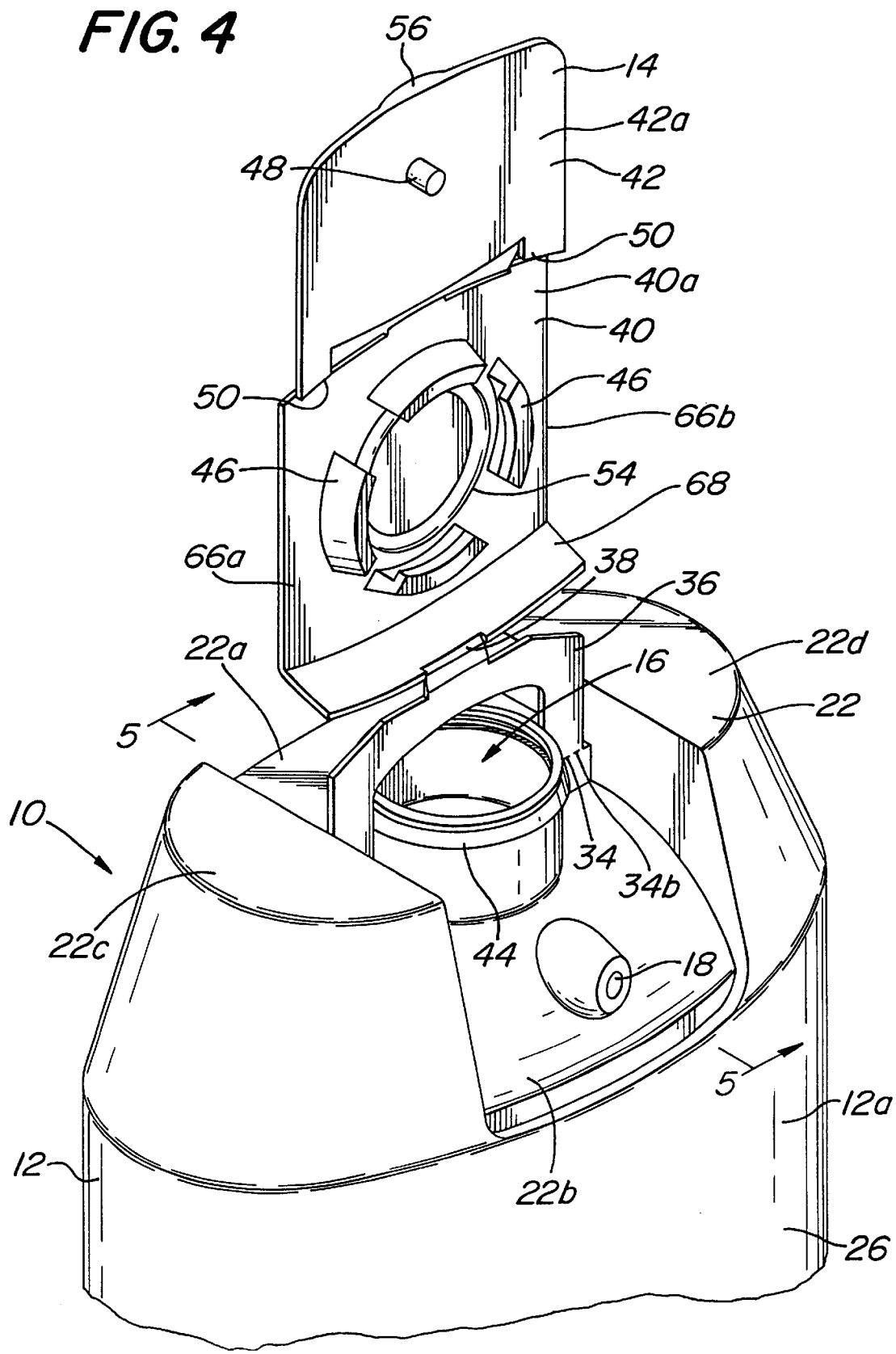

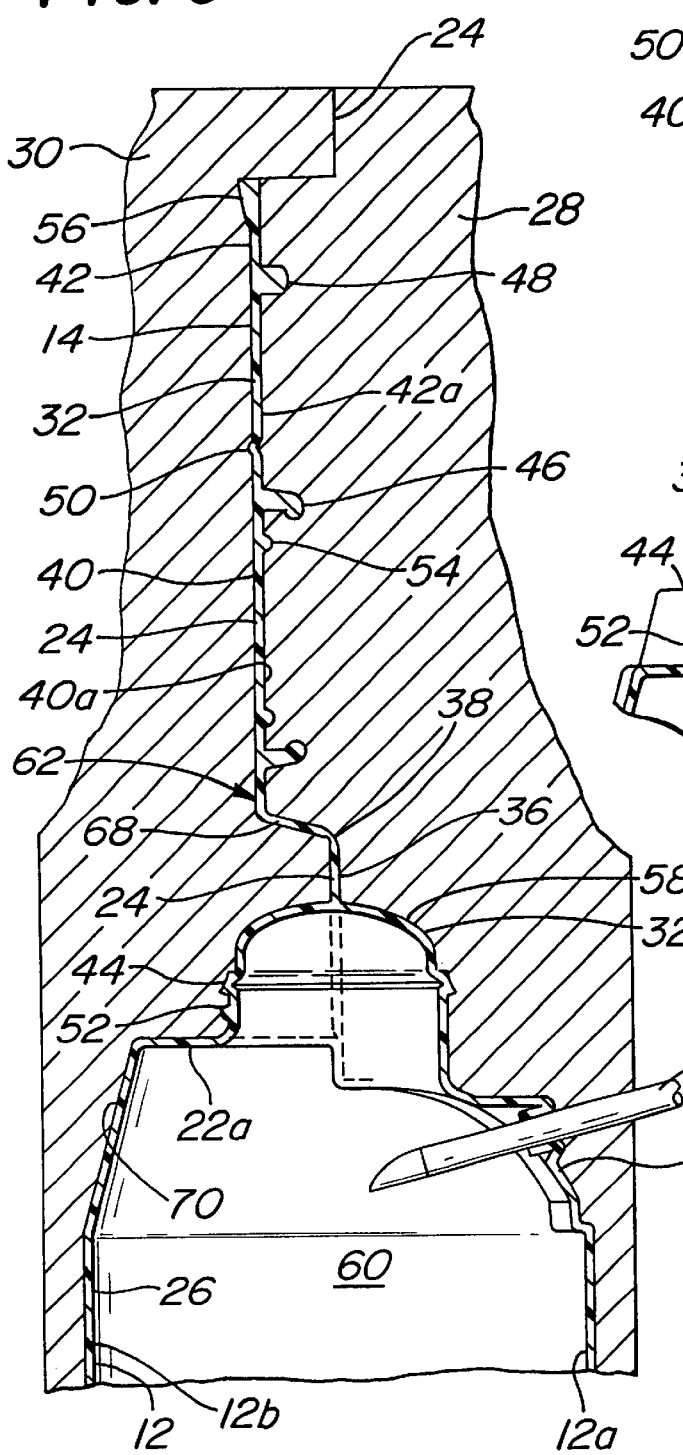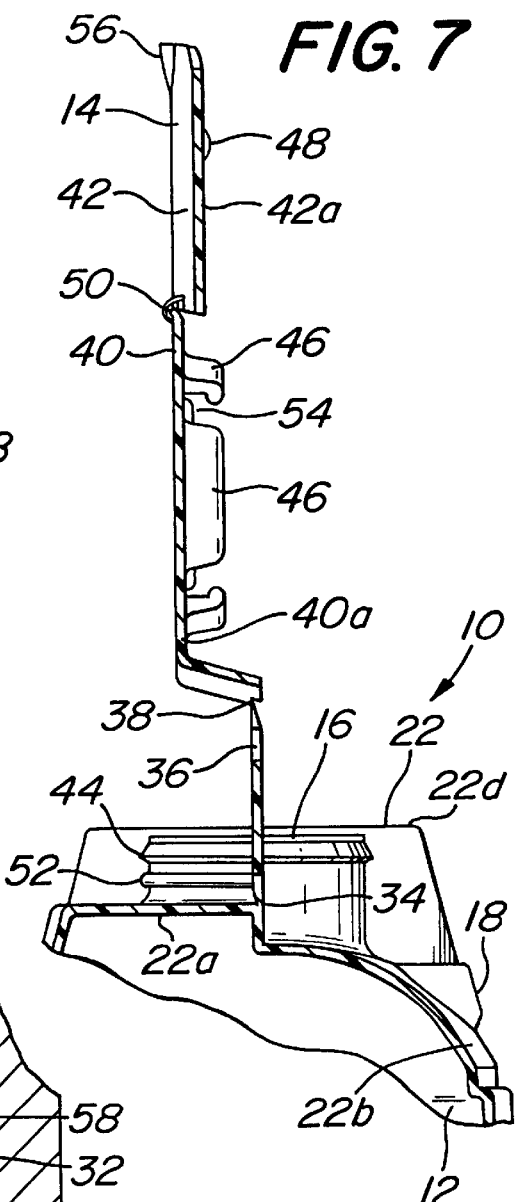

INTEGRALLY BLOW-MOLDED CONTAINER AND CLOSURE

This application is a 371 of PCT/US97/03153 field Feb. 28, 1997, and also claims benefit of Prov. No. 60/013,139 filed Mar. 8, 1996.

FIELD OF THE INVENTION

The present invention relates to a blow-molded plastic container useful in packaging fluent products, and more particularly, the present invention relates to a container having a fill port and a dispensing port sealable by an integral closure flap formed by flash compressed during blow molding of the container body.

BACKGROUND OF THE INVENTION

Many fluent commercial products of a liquid, gel or granular nature are sold and dispensed from plastic containers. For instance, shampoo is generally provided in a blow-molded plastic container. Such a container has a relatively wide mouth to enable high speed fill by automated filling machinery.

Closures are separately injection molded and are applied to the containers after the containers have been charged with product. A relatively small closeable port is formed within the closure structure for use by the consumer to dispense individual-sized portions of product.

The cost of manufacturing and installing the separately formed closures adds significantly to the overall cost of mass producing the container and closure package.

While the aforementioned blow-molded containers having separately fabricated injection-molded closures are satisfactory for their intended purposes, there is a need in the art for a blow-molded container which can be filled and sealed, and which enables product to be dispensed readily, without requiring a separately fabricated closure and its associated costs. The container should be capable of being charged with product at high speeds, and yet allow the consumer readily to dispense individual-sized portions of product.

OBJECTS OF THE INVENTION

With the forgoing in mind, it is an object of the present invention to provide a novel blow-molded container and integral closure which is formed simultaneously with blow-molding of the container.

Another object of the present invention is to provide a blow-molded container having a relatively large fill port and a relatively small dispensing port which can both be sealed by an integrally formed closure.

A still further object of the present invention is to provide a low-cost, consumer-friendly blow-molded container and closure useful with a variety of fluent consumer products.

SUMMARY OF THE INVENTION

More specifically, the present invention provides a blow-molded container and closure combination for storing and dispensing a fluent product. The container has a body portion with a dispensing port and a closure flap of compressed flash formed integral with the body portion along a mold parting line during blow molding of the container body. The closure flap is hinged adjacent the body portion of the container and has a closure portion with a plug for releasably sealing the dispensing port.

Another aspect of the present invention involves a method of manufacturing the above referenced container and closure combination. In the method, a tube of plastic is blow molded within a pair of mold blocks. The mold blocks co-operate to form a primary mold cavity for the container body and a secondary cavity for the closure extending on a mold parting line. Simultaneous with the blow molding of the container body, a portion of the tube of plastic is compressed in the secondary cavity on the mold parting line to form a closure flap having hinges and closure plugs integral with the container body. Thereafter, the closure flap is trimmed of unwanted flash.

BRIEF DESCRIPTION OF THE DRAWINGS

For a better understanding of these and other objects, features and advantages of the invention, reference will be made to the following detailed description taken in conjunction with the accompanying drawings, in which:

FIG. 3 is a cross-sectional view along line 3—3 of the sealed container illustrated in FIG. 2;

FIG. 4 is a perspective view of the upper portion of an unsealed container embodying the present invention;

FIG. 5 is a cross-sectional view along line 5—5 of the unsealed container illustrated in FIG. 4;

FIG. 6 is a cross-sectional elevational view of the upper portion of a container illustrated in its associated mold block during blow-molding in accordance with the present invention; and FIG. 7 is a cross-sectional view of the upper portion of a container embodying the present invention.

DESCRIPTION OF THE PREFERRED EMBODIMENT

Figures 1, 2:
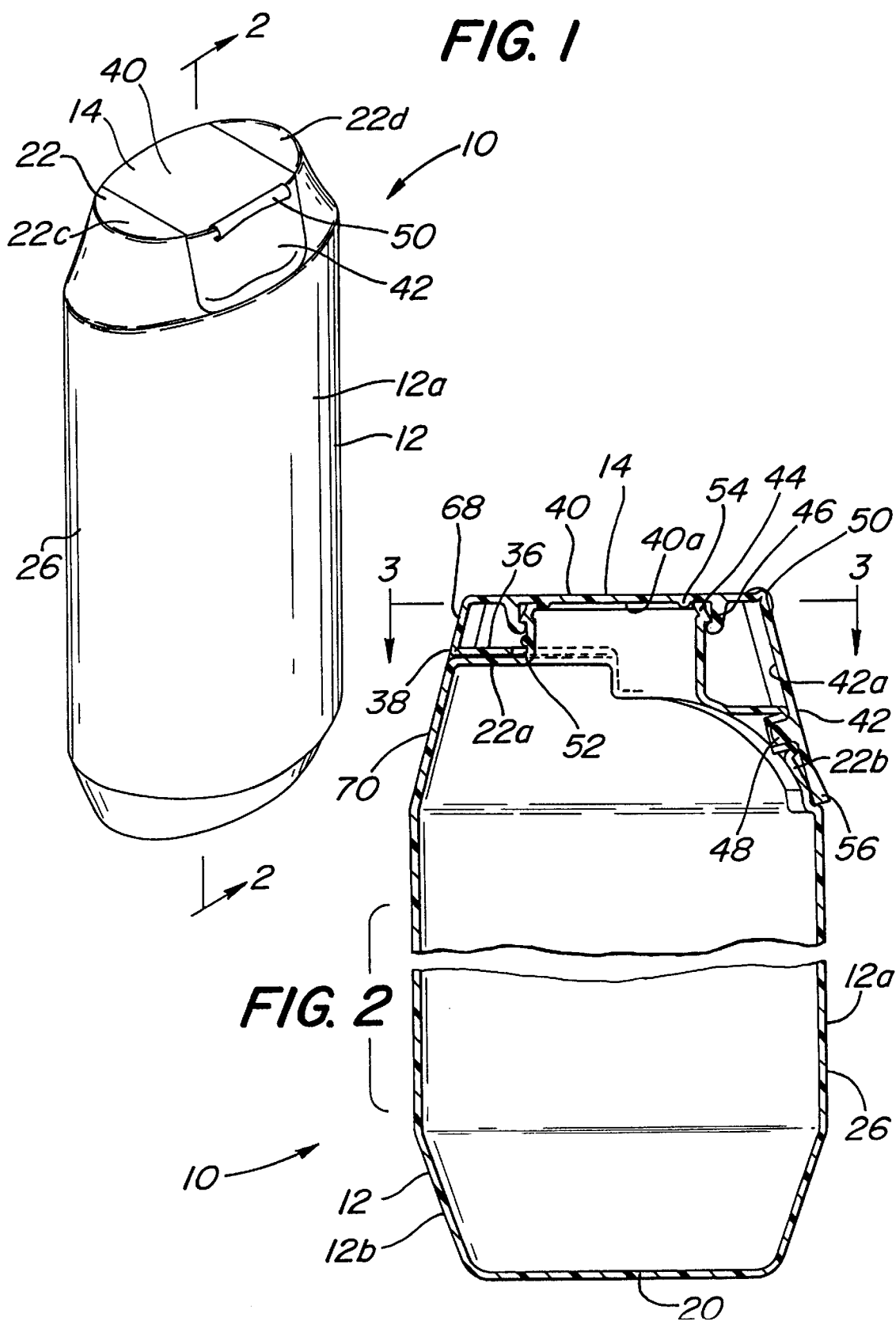
FIG. 1 is a perspective view of a container in a sealed condition embodying the present invention.
FIG. 2 is a cross-sectional view along line 2—2 of the sealed container illustrated in FIG. 1.

The container 10 illustrated in the drawings is particularly suited for use in packaging fluent consumer products, such as liquid, gel or granular products. Examples of such products include shampoos, hair conditioners, dish-washing detergents, hand lotions, toothpastes, etc. The fluent product is intended to be poured from, or squeezed out of, the container 10.

The major advantage provided by the container of the present invention is that a closure flap 14 is formed integral with the container 10 during blow molding of the container body 12. This reduces the overall cost to manufacture the package due to the elimination of the need to separately manufacture and install an injection molded closure. Moreover, the container and closure, being of the same type of plastic, simplify recycling.

Another feature of the container 10 of the present invention is the use of multiple ports. Preferably, the container 10 has a relatively large port 16 used when the container 10 is initially filled with product, or is refilled with product by the ultimate consumer. The port 16 facilitates filling by means of high speed, automated machinery capable of charging product into the container 10 at high volumetric flow rates. The container 10 also has a smaller sized dispensing port 18 for use by the consumer to dispense single-sized portions of product.

In the preferred embodiment, both the fill port 16 and the dispensing port 18 are independently sealed by the closure flap 14. The closure flap 14 and dispensing port 18 co-operate to provide ready opening and closing of the dispensing port 18 by the consumer.

As illustrated, the container 10 has a hollow, generally elongate body portion 12 with a sidewall 26 and a base 20. The base 20 can be flat, as illustrated, to enable the body portion 12 to stand upright; or alternatively, the container 10 could have other than a flat base, such as a pinched bottom, and could be rested on its side as is common with tubes of toothpaste. If a pinched bottom (not shown) is utilized, the container is filled via the bottom before being pinched; this eliminates the need for a large upper end fill port, so that the closure flap is only required to seal the dispensing port.

In the preferred embodiment illustrated, the container body portion 12 has a top wall 22 on which the fill port 16 and the dispensing port 18 are located. The top wall 22, as illustrated, is formed by a horizontal land 22a, an angled front land 22b, and two upstanding laterally-spaced protrusions, or shoulders, 22c and 22d. The fill port 16 is centrally located on the top wall 22 and the dispensing port 18 is offset from the fill port 16 on the angled front land 22b. Preferably, both ports 16 and 18 are circular with the diameter of the fill port 16 being significantly greater than the diameter of the dispensing port 18, such as by a factor of five or six.

As best shown in FIG. 6, a mold parting line 24, where two mold halves, 28 and 30, meet when the container 10 is blown, extends vertically and centrally of the top wall 22. The mold parting line 24 is the dividing line between a front portion 12a of the container body 12 and a rear portion 12b of the container body 12. Preferably, as illustrated, the mold parting line 24 is located directly above the fill port 16; however, the fill port 16 or the mold blocks, 28 and 30, could be designed so that the fill port 16 is not directly below the mold parting line 24.

During blow molding of the container body 12, flash material 32 is compressed on the mold parting line 24 above the top wall 22 to form the closure flap 14. A primary live hinge 34 is formed at the juncture of the closure flap 14 and the container body 12 so that the closure flap 14 is movable relative to the container body 12 to provide a flip-style lid.

The preferred embodiment, as illustrated, utilizes a closure flap 14 which reversely folds upon itself. To this end, the closure flap 14 is formed with a clevis-like fold back portion 36 and a secondary live hinge 38. The fold back portion 36 extends rearwardly from the primary live hinge 34 and terminates at the secondary live hinge 38 which is spaced from and is parallel to the primary live hinge 34 but at the rear of the container. The primary live hinge 34 is interrupted by the fill port 16; therefore, the primary live hinge 34 is formed by hinge segments 34a and 34b extending in diametrically-opposite directions on the top wall 22 on opposite sides of the fill port 16. The primary live hinge 34 allows the fold back portion 36 to be folded in a direction away from the dispensing port 18, and the secondary live hinge 38 allows the remainder of the closure flap 14 to be reversely folded to overlie the top of the container body.

An advantage of the closure flap 14 which reversely folds is that when the closure flap 14 seals the ports, 16 and 18, a sleek container configuration is provided. For instance, as best illustrated in FIGS. 1 and 2, the closure flap 14 has a pair of lateral edges, 66a and 66b, extending between the protrusions, 22c and 22d from the rear to the front of the container top. The protrusions, 22c and 22d, have top surfaces which project to the same level as the closure flap 14 to conceal its side edges, 66a and 66b, and to protect the flap 14 from inadvertent disengagement. The rear surface 68 of the closure flap 14 inclines at the same angle as the back container body wall 70 to form a continuation thereof. In like manner, the dispensing port closure portion 42 is inclined when the closure flap 14 is in its closed position. Thus, the closure flap 14 conforms to the shape of the sidewall 26 and top wall 22 to form a container 10 with an exterior surface which is substantially continuous, smooth and without significant interruption. A locking bead 52 extending outwardly from the neck of the fill port 16 through a 180° arcuate extent on the side thereof opposite the dispensing port 18 locks the fold back portion 36 of the closure flap 14 in abutting relation with the horizontal land 22a of the top wall 22 to ensure the formation of the smooth exterior surface between the transition from the sidewall 26 to the closure flap 14 when the closure flap 14 is in its closed position.

In an alternative embodiment, which is not illustrated, the mold parting line and the fill port is designed so that they the mold parting line is not directly above the fill port. In this embodiment, the primary live hinge is continuous and un-interrupted, and the closure flap does not require a fold back portion or secondary live hinge. Rather, the entire closure flap merely folds along the primary live hinge in one direction toward the fill and dispensing ports. However, this embodiment does not provide continuous, smooth transitions between the exterior surface of the container body and the closure flap as in the illustrated embodiment.

To seal the fill port 16, the closure flap 14 has a fill port closure means, or portion, 40 which extends from the secondary live hinge and has a plurality of fingers 46 which depend from its underside 40a to engage the periphery of the fill port 16. The fingers 46 engage a laterally extending flange 44 surrounding the periphery of the fill port 16. An annular sealing bead 54 extends from the underside 40a to form a fluid tight seal between the inner periphery of the fill port 16 and the fill port closure portion 40.

To seal the dispensing port 18, the closure flap 14 has a dispensing port closure means, or portion, 42 with a plug 48 which releasably seals the dispensing port 18. The dispensing port closure portion 42 extends from the fill port closure portion 40 remote from the secondary live hinge 38. The plug 48 projects from the underside 42a of the dispensing port closure portion 42. A tertiary live hinge 50 is formed between the closure portions, 40 and 42, so that the dispensing port 18 can be readily opened and closed independent from the fill port 16. The dispensing port closure portion 42 is also preferably provided with an outwardly extending nub 56 which can be engaged by a finger of the user to provide leverage in opening the dispensing port 18.

DESCRIPTION OF THE PREFERRED METHOD

The container 10 is preferably manufactured by extrusion blow-molding in which a tube of molten plastic (not shown), known as a parison, is extruded between a pair of open mold halves. The thickness of the walls of the parison can be adjusted as required during extrusion by known techniques. As shown in FIG. 6, the mold halves, 28 and 30, are closed on the extruded parison, and a blow needle 64 is inserted into the parison to inflate it into the configuration of the mold cavity. Preferably, the blow needle 64 is inserted at the location of the dispensing port 18 to form the dispensing port 18.

The mold halves, 28 and 30, according to the present invention, provide both a primary cavity 60 having a predetermined shape of the intended container body 12 and a secondary cavity 62 along the mold parting line 24 to form an integral closure flap 14 from flash material 32. Thus, simultaneous with blow molding the container body 12, flash material 32 is compressed along the mold parting line 24 in the secondary cavity 62 to form a closure flap 14.

The flash material 32 is compressed to a primary live hinge 34 between the container body 12 and the closure flap 14 to allow the closure flap 14 to pivot relative to the container body 12. The closure flap 14 is also molded with a plug 48, fingers 46, an annular sealing bead 54, or the like to co-operate with the ports of the container body to seal the ports as described heretofore.

In the method of manufacturing the preferred container embodiment, a secondary live hinge 38 is also formed in the compressed flash to provided a reversely folding closure flap. To this end, a secondary live hinge 38 is formed a spaced distance from and parallel to the primary live hinge 34 for defining a fold back portion 36 therebetween. Thus, the fold back portion 36 is foldable along the primary live hinge 34 in a direction opposite the ports, 16 and 18, and along the secondary live hinge 38 in a reverse direction toward the ports, 16 and 18. The live hinges are formed by thinning the flash in a straight line, and thereby weakening the flap along that line. Other hinges can also be formed as desired such as the tertiary live hinge 50 previously discussed.

The blown container is removed from the mold and unwanted flash is severed from the container. As illustrated in FIG. 6, a dome shaped portion 58 of flash material 32 located over the fill port 16 is severed to open the fill port 16. The dome shaped portion 58 is also severed from the fold back portion 36 of the closure flap 14 to allow the fold back portion to be pivoted relative to the container body 12 along the primary live hinge 34.

In view of the foregoing, it should be apparent that the present invention now provides a blow-molded plastic container formed with an integral closure and a method of manufacturing same. The container provides a relatively large fill port and a companion dispensing port. A separately fabricated injection molded closure and its associated manufacturing and installation costs are thereby avoided, and a recycling-friendly container is produced.

While preferred embodiments of the present invention have been described in detail, various modifications, alterations, and changes may be made without departing from the spirit and the scope of the present invention as defined in the appended claims.

What is claimed is:

1. An extrusion blow-molded container (10) and compression molded integral closure comprising:
    an extrusion blow-molded body portion (12) having a top wall (22) with at least one dispensing port (18) located thereon; and
    a co-extruded closure flap (14) extruded integral with said top wall (22) of said body portion (12) and compression molded along a mold parting line (24) extending longitudinally of said body portion during extrusion blow molding of the container (10), said closure flap (14) having a primary live hinge (34) adjacent said top wall (22) of said body portion (12) and a closure portion (40, 42) for releasably sealing said dispensing port (18), said primary live hinge lying in a plane which extends upwardly of said top wall (22) for permanently tethering said closure flap to said body portion and enabling selective opening and closing of said dispensing port.

2. A blow-molded container (10) and closure according to claim 1, wherein said closure flap (14) has a secondary live hinge (38) a spaced distance from and parallel to said primary live hinge (34) so that said closure flap (14) is capable of folding reversely.

3. A blow-molded container (10) and closure according to claim 2, wherein said body portion (12) has a fill port (16) which is offset from said dispensing port (18), said fill port (16) being located closer than said dispensing port (18) to said primary live hinge (34); and wherein said closure portion (40, 42) of said closure flap (14) has a dispensing port closure means (42) for releasably sealing said dispensing port (18) and a fill port closure means (40) for sealing said fill port (16).

4. A blow-molded container (10) and closure according to claim 3, wherein said closure flap (14) has a tertiary live hinge (50) formed between said fill port closure means (40) and said dispensing port closure means (42) so that said dispensing port (18) can be opened and closed independently of said fill port (16).

5. A blow-molded container (10) and closure according to claim 4, wherein said fill port (16) intersects said mold parting line (24), and wherein said primary live hinge (34) is formed by two discrete hinge segments (34a, 34b) extending from opposite sides of said fill port (16) along said-mold parting line (24).

6. A blow-molded container (10) and closure according to claim 5, wherein said dispensing port closure means (42) includes a plug-like projection (48) for releasably sealing said dispensing port (42).

7. A blow-molded container (10) and closure according to claim 6, wherein said fill port (16) has a peripherally extending flange (44), and said fill port closure means (40) includes a plurality of fingers (46) for engaging said flange (44) to seal said fill port (16).

8. An extrusion blow-molded plastic container (10) for storing and dispensing a fluent product, comprising:
    an extrusion blow-molded body portion (12) for storing the product;
    said body portion (12) having a top wall (22) with an upstanding fill port (16) extending upwardly therefrom for initially receiving the product in said body portion (12);
    said body portion (12) having a dispensing port (18) for dispensing product from said body portion (12), said dispensing port (18) being located on said top wall (22) and being offset from said fill port (16); and
    a co-extruded closure flap (14) extruded integral with said top wall (22) of said body portion (12) and compression molded along a mold parting line extending longitudinally of said body portion to-provide a primary live hinge (34) therebetween, said closure flap (14) moveable about said primary live hinge (34) into a position sealing said fill port (16) and releasably sealing said dispensing port (18), said primary live hinge lying in a plane which extends upwardly of said top wall (22) for permanently tethering said closure flap to said body portion and enabling selective opening and closing of said dispensing port.

9. A blow-molded plastic container (10) according to claim 8, wherein said closure flap (14) has a fold back portion (36) and a secondary live hinge (38), said fold back portion (36) extends from said primary live hinge (34) and terminates at said secondary live hinge (38), said secondary live hinge (38) being a spaced distance from and parallel to said primary live hinge (34).

10. A blow-molded plastic container (10) according to claim 9, wherein said closure flap (14) has a closure portion (40, 42) extending from said secondary live hinge (38) and being capable of covering both said fill port (16) and said dispensing port (18) when said fold back portion (36) is folded in a direction away from said dispensing port (18) and said closure portion (40, 42) is reversely folded over said fold back portion (36).

11. A blow-molded plastic container (10) according to claim 10, wherein said closure portion (40, 42) includes a fill port closure means (40) adjacent said secondary live hinge (38) for sealing said fill port (16) and a dispensing port closure means (42) extending from said fill port closure means (40) remote from said secondary live hinge (38) for releasably sealing said dispensing port (18); and wherein said closure flap (14) has a tertiary live hinge (50) located between said fill port closure means (40) and said dispensing port closure means (42) so that said dispensing port (18) can be opened and closed independently of said fill port (16).

12. A blow-molded plastic container (10) according to claim 11, wherein said body portion (12) has a base (20) capable of supporting said body portion (12) in an erect position on a substantially horizontal surface.

13. A blow-molded plastic container (10) according to claim 8, wherein said closure flap (14) is formed of compressed flash (32) extending between a pair of mold halves (28, 30) along a mold parting line (24) during blow molding of said body portion (12).

14. An extrusion blow-molded dispensing container and closure combination (10), comprising:

an extrusion blow-molded container body (12) having a top wall (22) with a dispensing port (18);

a co-extruded closure flap (14) extruded integral with said top wall (22) of said container body (12) and compression molded along a mold parting line extending longitudinally of said body portion during extrusion blow-molding thereof, said closure flap (14) having an integral primary hinge (34) affording pivoting of said closure flap (14) between a closure position blocking flow from said dispensing port (18) and an open position affording dispensing from said dispensing port (18), said closure flap (14) having opposed side edges (66a, 66b) extending from said primary hinge (34), and said primary live hinge lying in a plane which extends upwardly of said top wall (22);

a pair of protrusions (22c, 22d) extrusion blow-molded integral with said container body (12), said pair of protrusions (22c, 22d) extending in spaced parallel relation along said closure flap side edges, said pair of protrusions (22c, 22d) having outer surfaces that cooperate with said closure flap (14) to provide said container (10) with a smooth surface contour in the region of said closure flap (14) when in said closed position.

15. A blow-molded dispensing container and closure combination (10) according to claim 14, wherein said container (10) has a mold parting line (24) dividing it into a front portion (12a) and rear portion (12b) with said dispensing port (18) being located in said front portion (12a) and said primary hinge (34) being located on said mold parting line (24).

16. A blow-molded dispensing container and closure combination (10) according to claim 15, wherein said closure flap (14) has a fold back portion (36) and a secondary hinge (38), said fold back portion (36) extends from said primary hinge (34) and terminates at said secondary hinge (38), said secondary hinge (38) being a spaced distance from and parallel to said primary live hinge (34); and wherein said closure flap (14) has a closure means (40, 42) extending from said secondary hinge (38) and being capable of plugging said dispensing port (18) when said fold back portion (36) is folded in a direction away from said dispensing port (18) and said closure means (40, 42) is reversely folded.

17. A method of blow-molding a container (10) for storing and dispensing fluent products, comprising the steps of:

extruding a tube of plastic within a mold to form a container body (12), said mold comprising a pair of mold halves (28, 30) which co-operate to form a primary mold cavity (60) for the container body (12) and which form a secondary mold flash cavity (62) on a parting line (24) therebetween; and simultaneously with blowing said tube formed in said extruding step, compressing a portion of the tube of plastic in said flash cavity (62) along the mold parting line (24) to form a co-extruded closure flap (14) having a primary live hinge (34) integral with said container body (12) lying in a plane extending upwardly from said container body for permanently tethering said closure flap to said container body.

18. A method according to claim 17, including the step of forming at least one port (16, 18) in said container body (12) during said blow molding step co-operable with said closure flap (14) to releasably seal said at least one port (16, 18).

19. A method according to claim 18, further comprising the step of compression forming a secondary live hinge (38) in said closure flap (14) a spaced distance from and parallel with said primary live hinge (34) so that said closure flap (14) is capable of folding reversely.

20. A method according to claim 19, including the step of molding said container body (12) with both a fill port (16) and a dispensing port (18); and further comprising the step of compression forming a fill port closure means (40) and a dispensing port closure means (42) on said closure flap (14) so that said fill port closure means (40) is capable of sealing said fill port (16) and said dispensing port closure means (42) is capable of releasably sealing said dispensing port (18).

* * * * *